(12) United States Patent
Eriksen

(10) Patent No.: US 11,333,263 B2
(45) Date of Patent: May 17, 2022

(54) ELECTROMECHANICAL FORCE ACTUATOR

(71) Applicant: Electrical Subsea & Drilling AS, Straume (NO)

(72) Inventor: Egil Eriksen, Ål (NO)

(73) Assignee: Electrical Subsea & Drilling AS, Straume (NO)

( * ) Notice: Subject to any disclaimer, the term of this patent is extended or adjusted under 35 U.S.C. 154(b) by 951 days.

(21) Appl. No.: 16/072,574

(22) PCT Filed: Jan. 18, 2017

(86) PCT No.: PCT/NO2017/050016
§ 371 (c)(1),
(2) Date: Jul. 25, 2018

(87) PCT Pub. No.: WO2017/138816
PCT Pub. Date: Aug. 17, 2017

(65) Prior Publication Data
US 2019/0032806 A1    Jan. 31, 2019

(30) Foreign Application Priority Data

Feb. 10, 2016 (NO) .................................. 20160219

(51) Int. Cl.
*E21B 33/035*    (2006.01)
*E21B 33/064*    (2006.01)
(Continued)

(52) U.S. Cl.
CPC .......... *F16K 31/047* (2013.01); *E21B 33/035* (2013.01); *E21B 33/06* (2013.01);
(Continued)

(58) Field of Classification Search
CPC .... E21B 33/035; E21B 33/064; F16K 31/046; F16K 31/047
See application file for complete search history.

(56) References Cited

U.S. PATENT DOCUMENTS 6,585,228 B1    7/2003  McCaskill
9,920,852 B2 *  3/2018  Garrone ................ F16K 31/047
(Continued)

FOREIGN PATENT DOCUMENTS

WO    2010/099325    9/2010
WO    2012/123694    9/2012
(Continued)

OTHER PUBLICATIONS

Norwegian Search Report for Application No. 20160219 dated May 5, 2017.
(Continued)

*Primary Examiner* — Matthew R Buck
(74) *Attorney, Agent, or Firm* — Patterson + Sheridan, LLP

(57) ABSTRACT

A force actuator including an actuator housing, in which, via transmission elements, an electric motor is arranged to drive a displaceable roller screw along the longitudinal axis of the force actuator, and in which a rotatable roller cage which is in engagement with the transmission elements is provided with at least one threaded roller, the threaded roller being in threaded engagement with the roller screw, and the roller screw being prevented from rotating around the longitudinal axis.

6 Claims, 4 Drawing Sheets

(51) Int. Cl.
  *F16K 31/04* (2006.01)
  *F16K 31/53* (2006.01)
  *F16H 25/22* (2006.01)
  *E21B 33/06* (2006.01)
  *F16H 1/46* (2006.01)

(52) U.S. Cl.
  CPC ....... *E21B 33/064* (2013.01); *F16H 25/2252* (2013.01); *F16K 31/046* (2013.01); *F16K 31/53* (2013.01); *F16H 1/46* (2013.01)

(56) References Cited

U.S. PATENT DOCUMENTS

| | | | |
|---|---|---|---|
| 2009/0247365 A1 | 10/2009 | Di Stefano et al. | |
| 2015/0008000 A1* | 1/2015 | Eriksen | E21B 33/063 166/363 |
| 2015/0300520 A1 | 10/2015 | Lenz | |

FOREIGN PATENT DOCUMENTS

| WO | 2013/119126 A1 | 8/2013 |
|---|---|---|
| WO | 2013/119127 A1 | 8/2013 |

OTHER PUBLICATIONS

International Search Report for Application No. PCT/NO2017/050016 dated Mar. 30, 2017.
Written Opinion for Application No. PCT/NO2017/050016 dated Mar. 30, 2017.

* cited by examiner

ELECTROMECHANICAL FORCE ACTUATOR

CROSS REFERENCE TO RELATED APPLICATIONS

This application is § 371 of International Patent Application No. PCT/N02017/050016 filed on Jan. 18, 2017, which claims priority to Norwegian Patent Application No. 20160219 filed on Feb. 10, 2016.

BACKGROUND OF INVENTION

Field of Invention

Embodiments of the present disclosure generally relate to a force actuator.

Description of Related Art

The term "force actuator" is used to emphasize that an actuator according to the invention is particularly well suited for applications in which great actuating forces are required. The field of application is typically cutting and barring functions in blowout preventers for drilling and well-completion applications and corresponding functions for lighter well-intervention equipment. The force requirement may be in the order of 1000-3000 metric tonnes for the function requiring the most force. The force actuator may be adapted for underwater use.

Electromechanical actuators for underwater use have been developed. Thus, NO 336045 discloses an electromechanical force actuator in which, via transmission elements, an electric motor, comprising a stator and a rotor, is arranged to synchronously drive at least two parallel screw-nut connections cooperating in the same direction of displacement. The cooperating screw-nut connections are connected to an actuation element. Adjusting the load distribution on the parallel, synchronized screws, to avoid subjecting the screws and the actuation element to too great a bending moment, is demanding and requirements for accuracy are great in the assembly and maintenance of the transmission elements of the actuator.

NO 333966 discloses an electromechanical annular-piston actuator. A centre opening through the actuator forms a fluid path with a diameter allowing equipment for well operations or drilling to be passed through. An electric annular motor encircles, and is connected to, an actuator nut with internal threaded rollers, which are in engagement with an externally threaded sleeve, connected to an axially displaceable annular piston.

U.S. Pat. No. 6,585,228B1 discloses a valve actuator comprising an eddy current clutch, wherein an electric motor is arranged for powering a displaceable roller screw in the direction of the longitudinal axis of the actuator.

The invention has for its object to remedy or reduce at least one of the drawbacks of the prior art or at least provide a useful alternative to the prior art.

The object is achieved through the features that are specified in the description below and in the claims that follow.

BRIEF SUMMARY OF THE INVENTION

This invention relates to a force actuator. It relates, more particularly, to a force actuator which includes an actuator housing and in which, via transmission elements, an electric motor is arranged to drive a displaceable roller screw along the longitudinal axis of the force actuator, a rotatable roller cage, which is in engagement with the transmission elements, is provided with at least one threaded roller, the threaded roller being in threaded engagement with the roller screw, which is prevented from rotating around the longitudinal axis.

An electrically operated, relatively compact force actuator has been built up around an actuation element in the form of a roller screw. A number of threaded rollers are distributed around and are in threaded engagement with the roller screw as the threaded rollers are supported in a rotatable roller cage. The roller cage is driven via transmission elements by a built-in electric motor. The roller screw is prevented from being rotatable relative to the housing of the force actuator. In a preferred embodiment, the force actuator is provided with a brake and an actuation spindle for the external actuation of the force actuator. The force actuator is further provided with separate pressure-compensation chambers for the motor part and the roller-screw part. In addition to providing ordinary pressure compensation, the compensator of the actuator housing provides pressure compensation for a change in fluid volume in the actuator housing arising on axial displacement of the roller screw.

The invention is defined by the independent claim. The dependent claims define advantageous embodiments of the invention.

The invention relates, more specifically, to a force actuator including an actuator housing in which, via transmission elements, an electric motor is arranged to drive a displaceable roller screw along the longitudinal axis of the force actuator, and in which a roller cage which is in engagement with the transmission elements is provided with at least one threaded roller, which is in threaded engagement with the roller screw, and the roller screw being prevented from rotating around the longitudinal axis, and the force actuator being provide with an electromagnetic brake, wherein a first part of the brake is anchored to a motor housing and a second rotatable part is attached in an axially displaceable manner to the sun gear of a first planetary gearing.

A force actuator constructed according to the invention is well suited to generate great forces even with relatively small force-actuator dimensions. The cooperating elements, roller screw and roller nut, are known per se.

The roller screw may be provided with several parallel threads. The forces between the roller screw and threaded rollers may thereby be distributed in a favourable way.

A shaft, which is provided with splines, may be in rotation-preventing, displaceable engagement with locking splines in association with the roller screw. The shaft thereby prevents the roller screw from rotating, even when the at least one threaded roller is rolling against the threads of the roller screw.

An activation spindle, which is connectable to an external torque tool, may be in selectable engagement with the sun gear of the first planetary gearing. Should the electric motor fail, the force actuator may be activated by means of an external motor, for example by means of an ROV when the force actuator is submerged.

For underwater use, the force actuator may be pressure-compensated, the motor and the roller screw being in separate chambers. Provisions have thereby been made for using different fluids in the two chambers. Typically, the motor, which rotates relatively fast, is surrounded by a fluid of relatively low viscosity, whereas the roller screw, which runs more slowly, is surrounded by a fluid of higher viscosity. The two fluids will typically have other different properties as well.

The motor may include at least two independent sets of coils to ensure operation if one coil set or allocated control equipment and/or power supply should fail.

The apparatus according to the invention provides a relatively compact and light force actuator, which is arranged to be remote-controlled, with respect to both the force that it exerts and the relative position of the actuation element, consisting of the roller screw, of the force actuator.

The force actuator may be provided with a position indicator, for example, which, connected to a control system, may show the relative position of the roller screw in the force actuator at all times. The actuation force that the motor exerts on the roller screw is controlled by means of the input power.

BRIEF DESCRIPTION OF THE SEVERAL VIEWS OF THE DRAWINGS

In what follows, an example of a preferred embodiment is described, which is illustrated in the accompanying drawings, in which.

DETAILED DESCRIPTION OF THE INVENTION

Figure 1:
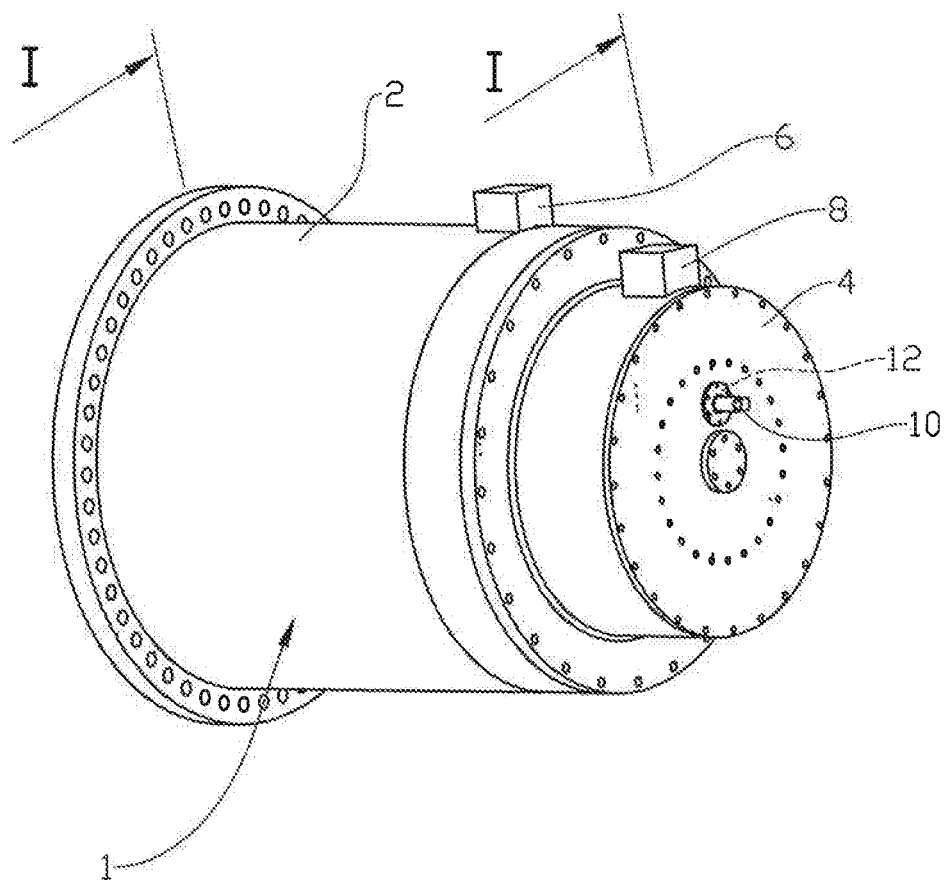
FIG. 1 shows, in perspective, the force actuator according to the invention seen from the motor side.

In the drawings, the reference numeral 1 indicates a force actuator according to the invention. As shown in FIG. 1, the force actuator 1 includes an actuator housing 2 and a motor housing 4, which is attached to the actuator housing 2. The actuator housing 2 and the motor housing 4 are provided with a first pressure compensator 6 and a second pressure compensator 8, respectively, of a design known per se. An activation spindle 10 projects through a sealed opening 12 in the motor housing 4.

Figure 2:
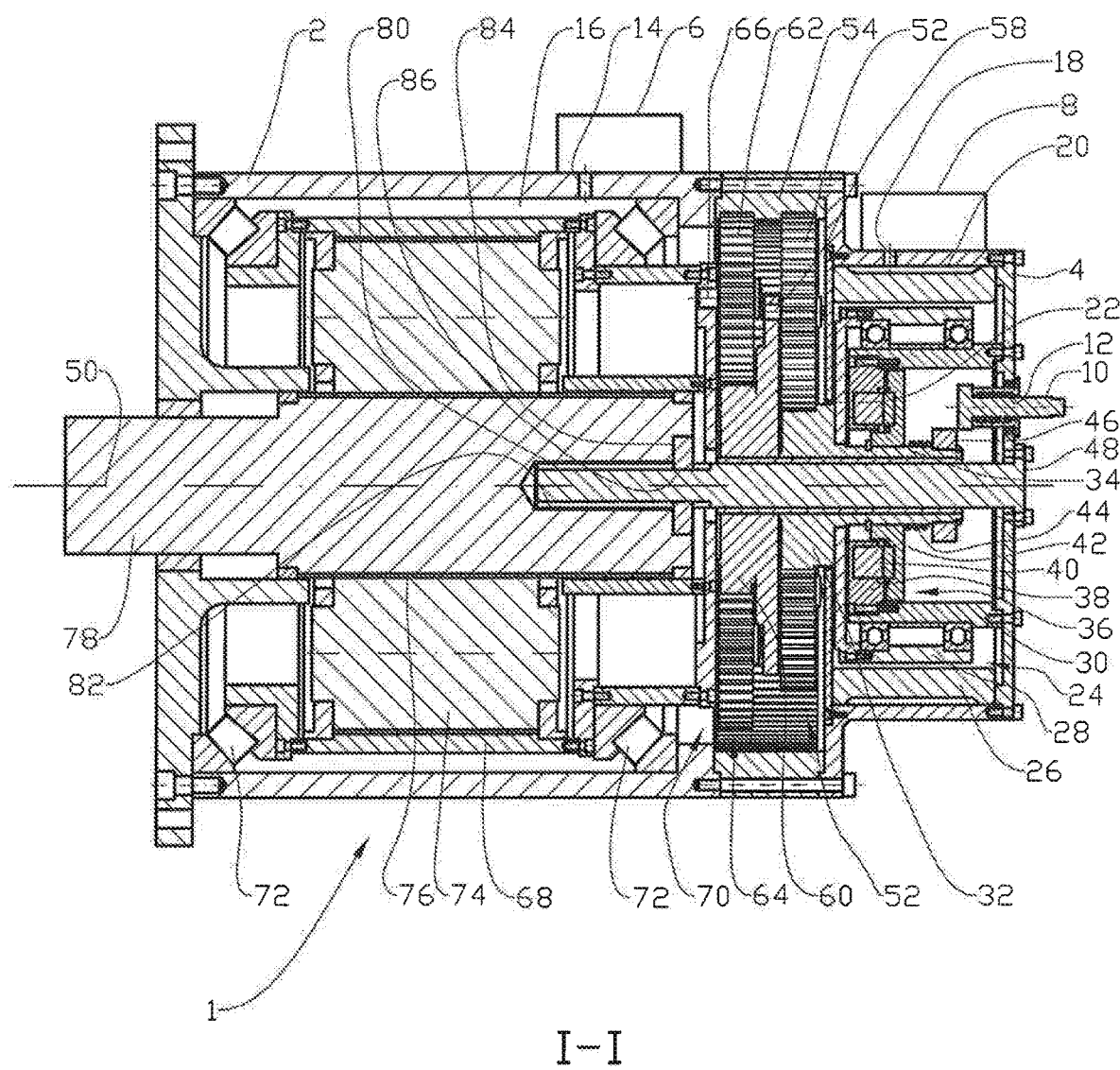
FIG. 2 shows an axial section I-I of FIG. 1 on a larger scale.
Figure 4:
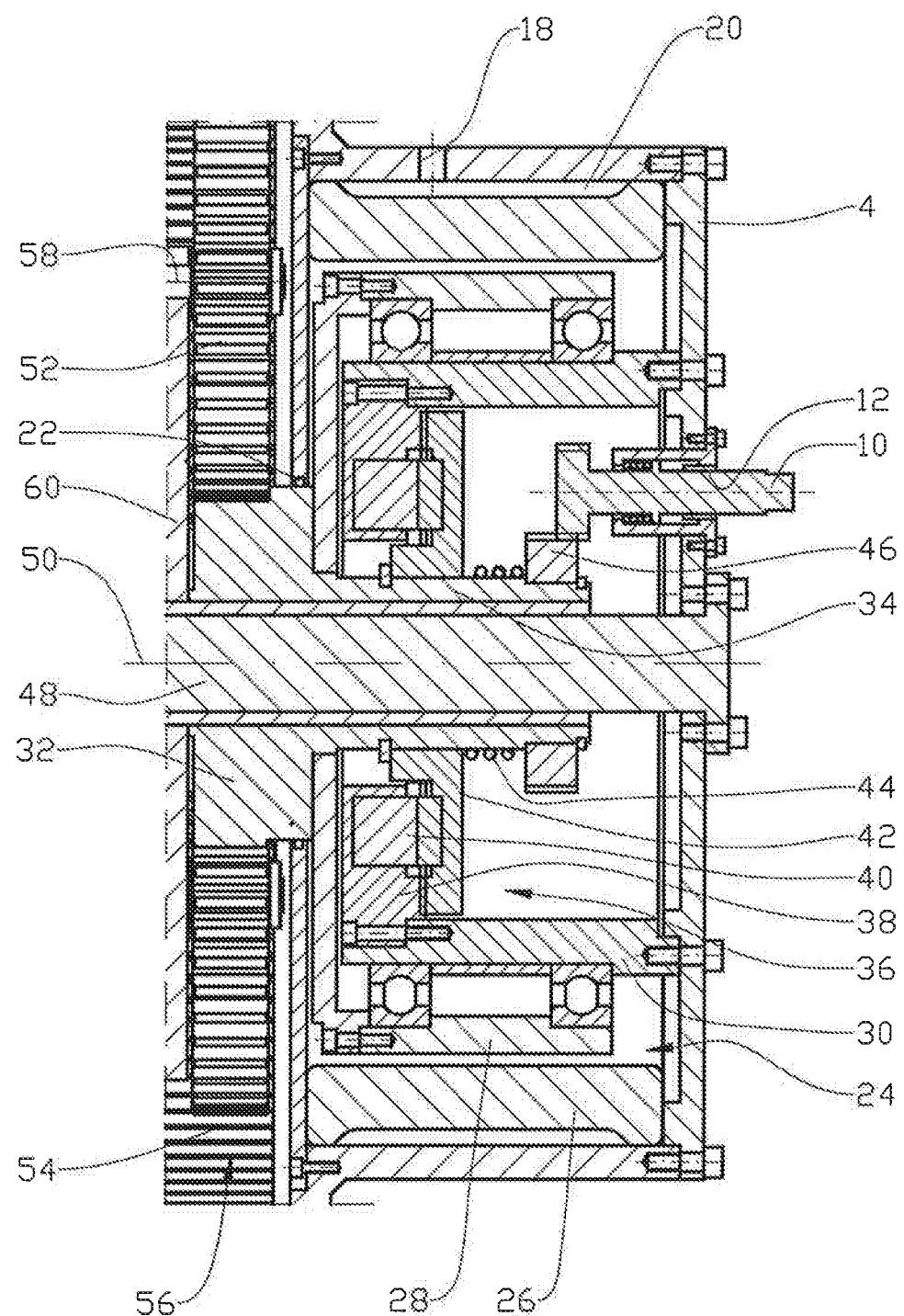
FIG. 4 shows a section of FIG. 2 on a larger scale.

Reference is now made to FIGS. 2 and 4.

A first compensation opening 14 connects the first pressure compensator 6 to a first chamber 16, which is in the actuator housing 2. A second compensation opening 18 connects the second pressure compensator 8 to a second chamber 20, which is in the motor housing 4. The first chamber 16 and the second chamber 20 are separated by means of a seal 22. The pressure compensators 6, 8 communicate with the ambient pressure.

An electric motor 24 is in the motor housing 4. The motor 24 includes a stator 26 with two independent sets of coils and a rotor 28. The stator 26 is supplied with power via wires not shown. The rotor 28 is rotatably supported on a sleeve bracket 30 attached to the motor housing 4. The rotor 28 is further connected to and drives a first sun gear 32.

The first sun gear 32 includes a relatively elongated sleeve 34 projecting inwards in the motor housing 4. An electromagnetic brake 36 is arranged between the sleeve 34 and the sleeve bracket 30. The brake 36 includes a first part 38 with an electromagnet 40, the first part 38 being attached to the motor housing 4 via the sleeve bracket 30, and a second part 42, which is displaceably attached to the sleeve 34. The first part 38 and the second part 42 cooperate so that, when the electromagnet 40 is deenergized, they are in spring-loaded, braking engagement with each other by means of a brake spring 44. The engagement between the parts 38 and 42 may be based on toothing and/or friction.

When voltage is applied to the electromagnet 40, the brake 36 is released by the second part 42 being moved out of the first part 38 as the force of the brake spring 44 is overcome. Should the electromagnet 40, which is supplied with energy via wires not shown, fail, the motor 24 is powerful enough to overcome the braking force.

The brake spring 44 pushes against an activation gear 46, which is attached to the sleeve 34. When the activation spindle 10 is being displaced into the motor housing 4 as is shown in FIG. 4, the activation spindle 10 rotatably engages with the activation gear 46 and thereby the first sun gear 32. In its deactivated position, the activation spindle 10 is kept disengaged from the activation gear 46 in a spring-displaceable manner.

The first sun gear 32 is supported around a shaft 48, which is centric relative to the longitudinal axis 50 of the force actuator 1. The shaft 48 is attached to the motor housing 4. The first sun gear 32 constitutes an abutment for the seal 22 that is the partition between the first chamber 16 and the second chamber 20. A seal, not shown, may also be arranged around the shaft 48 to prevent fluid communication between the two chambers 16, 20.

The first sun gear 32 is further in toothed engagement with a number of first planetary gears 52. The first planetary gears 52 are in mesh with an encircling ring gear 54, which is attached between the actuator housing 2 and the motor housing 4. The first sun gear 32, the first planetary gears 52 and the ring gear 54 constitute a first planetary gearing 56.

Rotatable around their centre axes 58, the first planetary gears 52 are attached to a planetary-gear carrier, which also forms a second sun gear 60. The second sun gear 60 is rotatably supported around the shaft 48 and is in toothed engagement with a number of second planetary gears 62. The second planetary gears 62 are in mesh with the ring gear 54. The second sun gear 60, the second planetary gears 62 and the ring gear 54 constitute a second planetary gearing 64.

Rotatable around their centre axes 66, the second planetary gears are attached to a roller cage 68. The first planetary gearing 56 and the second planetary gearing 64 thus constitute transmission elements 70 between the motor 24 and the roller cage 68.

The roller cage 68 is supported in the actuator housing 2 by means of relatively strong bearings 72 and is rotatable around the longitudinal axis 50. A number of threaded rollers 74 are rotatably supported in the roller cage 68. The threaded rollers 74, which are provided with threads 76 externally, are in threaded engagement with a roller screw 78, which is provided with a number of parallel threads and form the actuation element of the force actuator 1.

The roller screw 78 is supported, centred and displaceable along the longitudinal axis 50. The shaft 48 is provided with a splined portion 80 projecting into a bore 82 of the roller screw 78. A splined disc 84, which is provided with a centre cut-out 86 which complementarily fits the splined portion 80, is attached to the roller screw 78. The roller screw 78 is thereby prevented from being rotatable around the longitudinal axis 50. The splined disc 84 or the roller screw 78 is provided with vent holes, not shown, for ventilating the bore 82.

The roller screw 78 of the force actuator 1 is provided with drain openings, not shown, for pressure-compensation fluid wherever necessary in order to allow the fluid volume displaced in the actuator housing 2 to pass.

When the force actuator 1 is being activated, the electromagnet 40 is first energized, whereby it releases. The motor 24 is started and rotates the first sun gear 32 around the longitudinal axis 50. The first sun gear 32 drives the first planetary gears 52, which are in mesh with the ring gear 54. The first planetary gears 52 rotate in a manner known per se around the longitudinal axis 50, pulling the second sun gear 60 along at a reduced speed relative to the first sun gear 32.

The second sun gear 60 drives the second planetary gears 62, which are also in mesh with the ring gear 54. The second planetary gears 62 are rotated around the longitudinal axis 50, pulling the roller cage 68 along at a further reduced speed relative to the first sun gear 32.

Figure 3:
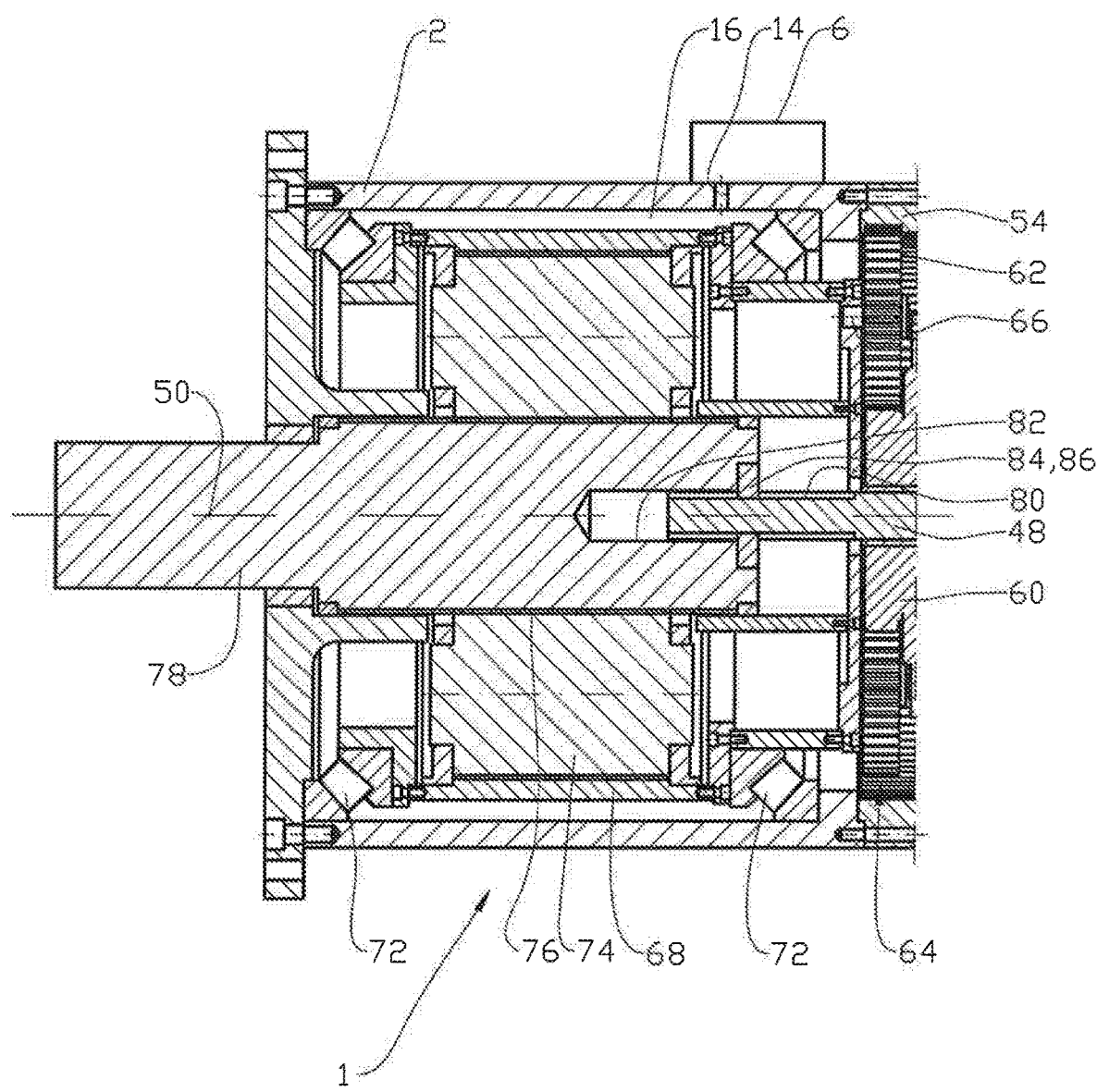
FIG. 3 shows the same as FIG. 2, but the force actuator has been activated.

When the roller cage 68 is rotated around the longitudinal axis 50, the threaded rollers 74 are rotated around the roller screw 78, where by the roller screw 78, as it is prevented from rotating around the longitudinal axis 50, is displaced axially relative to the actuator housing 2, see FIG. 3.

By the motor 24 being started in the opposite rotational direction, the roller screw 78, which constitutes the actuation element of the force actuator 1, will be displaced in the opposite direction.

The actuator 1 may also be operated with an external torque tool as illustrated in FIG. 4. When the gear of the spring-loaded activation spindle 10 is pushed into engagement with the activation gear 46 and the spindle 10 is rotated, the transmission elements 70, the roller cage 68 and the roller screw 78 are driven in a manner corresponding to that by normal motor operation. Preferably, the brakes 36 are released first, possibly the holding torque of the brake 36 is overcome with the torque tool if a functional fault makes this necessary.

It should be noted that all the above-mentioned embodiments illustrate the invention, but do not limit it, and persons skilled in the art may construct many alternative embodiments without departing from the scope of the attached claims. In the claims, reference numbers in parentheses are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An electrically operated force actuator for cutting and barring functions in blowout preventers for drilling and well-completion applications and corresponding functions for well-intervention equipment, the force actuator comprising an actuator housing, in which, via transmission elements, an electric motor is arranged to drive a displaceable roller screw along a longitudinal axis of the force actuator, a rotatable roller cage, which is in engagement with the transmission elements, is provided with at least one threaded roller, the threaded roller being in threaded engagement with the roller screw, which is prevented from rotating around the longitudinal axis, characterized in that the force actuator is provided with an electromagnetic brake, wherein a first part is anchored to a motor housing and a rotatable second part is attached in an axially displaceable manner to a first sun gear of a first planetary gearing, the first sun gear including a relatively elongated sleeve projecting inwards in the motor housing, the electromagnetic brake being arranged between the sleeve and a sleeve bracket, the first part of the electromagnetic brake being anchored to the motor housing via the sleeve bracket and provided with an electromagnet, the rotatable second part of the electromagnetic brake being displaceably attached to the sleeve, and the first part and the second part being arranged to engage with each other by means of a brake spring when the electromagnet is de-energized.

2. The force actuator according to claim 1, characterized in that the roller screw is provided with several parallel threads.

3. The force actuator according to claim 1, characterized in that a shaft, which is provided with a splined portion, is in rotation-preventing, displaceable engagement with a cut-out associated with the roller screw.

4. The force actuator according to claim 1, characterized in that an activation spindle, which is connectable to an external torque tool, is selectably engaged with the first sun gear of the first planetary gearing.

5. The force actuator according to claim 1, characterized in that the force actuator is pressure-compensated, the motor and the roller screw being in separate chambers.

6. The force actuator according to claim 1, characterized in that the motor includes at least two independent sets of coils.

* * * * *